United States Patent [19]

Costas

[11] B 3,925,168

[45] Dec. 9, 1975

[54] METHOD OF MONITORING THE ACTIVE ROUGHENING AGENT IN A COPPER PLATING BATH

[75] Inventor: Louis P. Costas, Cheshire, Conn.

[73] Assignee: Anaconda American Brass Company, Waterbury, Conn.

[22] Filed: July 26, 1972

[21] Appl. No.: 275,426

[44] Published under the Trial Voluntary Protest Program on January 28, 1975 as document no. B 275,426.

[52] U.S. Cl. ............. 204/1 T; 204/14 R; 204/45 R; 204/52 R; 204/195 R

[51] Int. Cl.² ....................... G01N 27/46; C23B 5/20

[58] Field of Search ............. 204/1 T, 195 R, 195 C

[56] References Cited

UNITED STATES PATENTS 3,479,256 11/1969 Smith et al. ......................... 204/1 T

*Primary Examiner*—T. Tung

*Attorney, Agent, or Firm*—Pennie & Edmonds

[57] ABSTRACT

A method and apparatus for determining the content of colloidal material, animal glue or other active roughening agent in a copper plating bath by determining the overvoltage-current density and comparing the results to similar data obtained with electrolytes whose plating behavior and active roughening agent content is known.

3 Claims, 4 Drawing Figures

METHOD OF MONITORING THE ACTIVE ROUGHENING AGENT IN A COPPER PLATING BATH

BACKGROUND OF THE INVENTION

Thin sheets of copper foil are used in various industrial applications and in particular sheets ranging from 0.0007 to about 0.010 inches in thickness are used in printed circuit applications. Typically, these sheets or foils are produced in continuous lengths by plating on rotating cylindrical cathodes whose surfaces are very smooth to facilitate foil removal after plating. Since the foil surface adjacent to the smooth cathode is an exact mirror image, the foil surface is also very smooth and therefore not suitable for bonding to printed circuit substrates. For this reason great attention has been given to the electrolyte side of the foil because experience has shown that a preferred roughened texture, which can bond very readily to substrates, can be attained during plating. Hereinafter, the term "foil surface" refers to the electrolyte side of the foil.

It has long been known that such a roughened surface condition could be obtained through acid-copper plating techniques by adding and controlling within the bath both the amount of chloride and the amount of animal glue or other active material which produces a roughened surface condition. The animal glue or similar material is hereinafter referred to as "an active roughening agent." The range of chloride concentration is not critical, 20–40 ppm being typical, and rapid analytical methods are readily available for monitoring its concentration. However, this is not the case with the active roughening agents used which are present typically in the narrow range of only 0.5 to 2 ppm. In addition, analytic techniques for such active roughening agents have not produced satisfactory readings at these low levels and further these techniques require 4 to 24 hours for completion.

The present invention introduces a scientific means for determining in minutes the active roughening agent concentration of the electrolyte.

SUMMARY OF THE INVENTION

Broadly, the invention is a method and apparatus for measuring and ultimately controlling the glue, colloidal material or other active agent which promotes the desired surface roughness by determining the overvoltage-current density characteristics of the electrolytes. A test cathode and an adjacent reference electrode are placed in the bath and connected to electrical equipment to permit the overvoltage or current to be held constant. By measuring current at known overvoltages, or overvoltage at known currents in electrolytes where the active roughening agent content is known, curves plotting these three values may be constructed. These curves thus provide the means for determining the active roughening agent content during normal plating operations by reading either overvoltage or current while the other is being held constant.

The apparatus for holding the test cathode and reference electrode includes a compact holder assembly with means to define the area being plated and to provide a facile manner of setting the distance between the cathode and reference electrode.

DESCRIPTION OF THE PREFERRED EMBODIMENT

Figure 1:
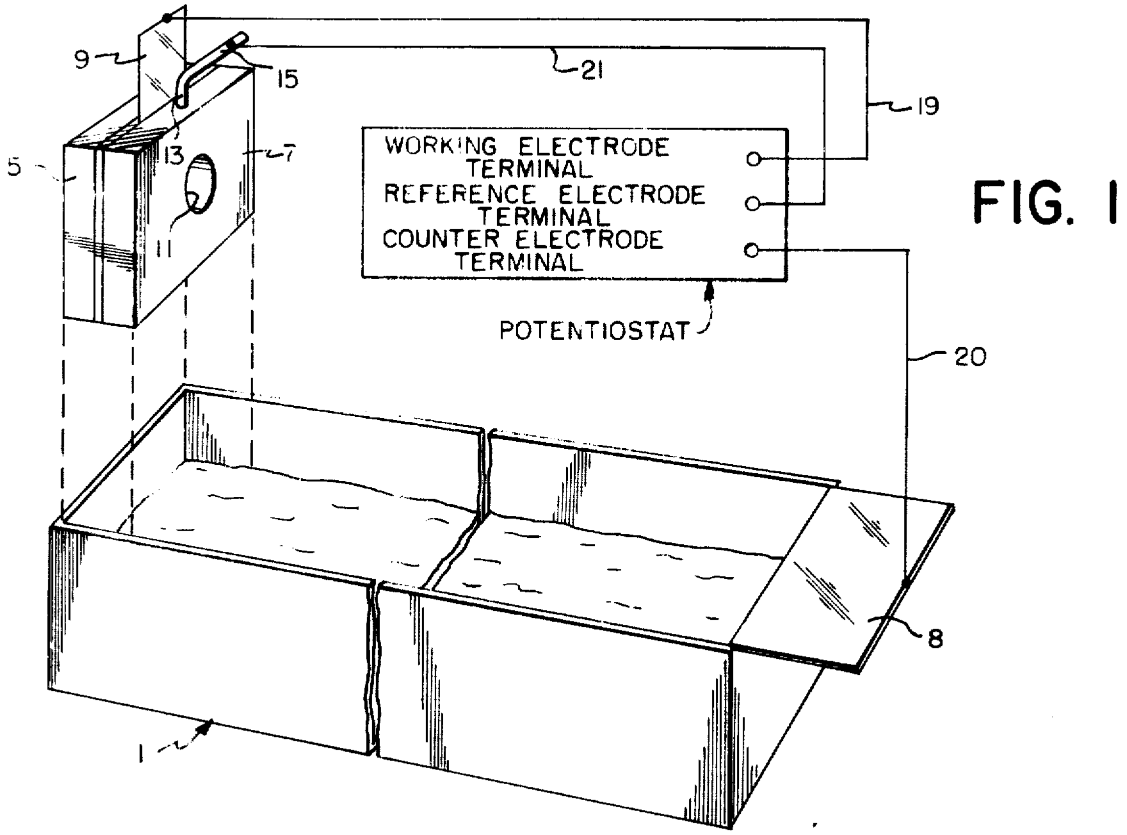
FIG. 1 is a perspective view of the test unit containing the electrolyte to be tested.

In the drawings, tank 1 contains the electrolyte to be tested for active roughening agent. Tank 1 is a small test tank into which a sample of the electrolyte is introduced but the testing apparatus may, if desired, be positioned in the tank where plating of the commercial foil or other object is being conducted.

Figure 2:
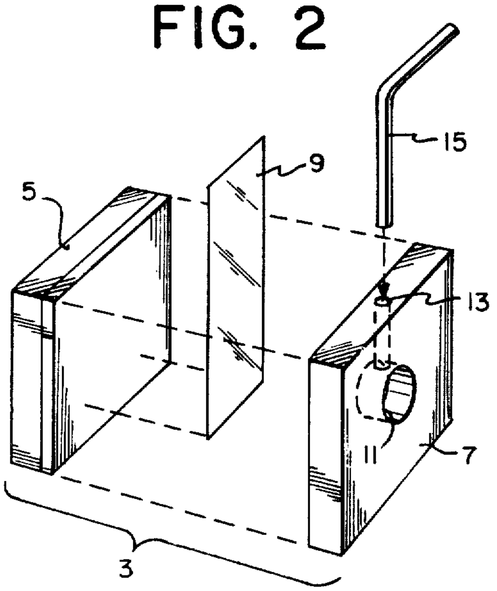
FIG. 2 is an exploded view of test assembly holder.

Test holder assembly 3, comprising two halves, 5 and 7 fabricated of electrically non-conductive material (see FIG. 2), is positioned in the tank at any suitable location which is a substantial distance from the anode 8. Holder halves are disassembled to receive the test cathode 9 and then are reassembled and secured together by suitable means. The test cathode is preferably made of a material similar to the material being produced. Assembly half 7 has two holes formed in it. One hole is a passageway 11 having an axis perpendicular to the surface of the test cathode and the other hole 13 provides a passageway for introducing the reference electrode 15 through the assembly half 7 to the periphery of the current density passageway 11 and positioned closely (1 mm) from the surface of test cathode 9. Preferably the reference electrode 15 should be made of the same material as test cathode 9.

An electronic instrument known as a potentiostat is used to maintain the voltage between reference electrode 15 and test cathode 9 at a selected value. The current flowing in wire 20 is then measured using suitable means and the cathodic current density is calculated. In the present embodiment, the test cathode 9 is connected to the potentiostat's working electrode terminal by means of the wire 19. The wire 15, which acts as the reference electrode, is connected to the potentiostat's reference terminal by wire 21 and the anode 8 is connected to the potentiostat's counter-electrode terminal by wire 20. The anode in the present case was copper but other metals such as platinum or stainless steel could also be employed.

Figure 3:
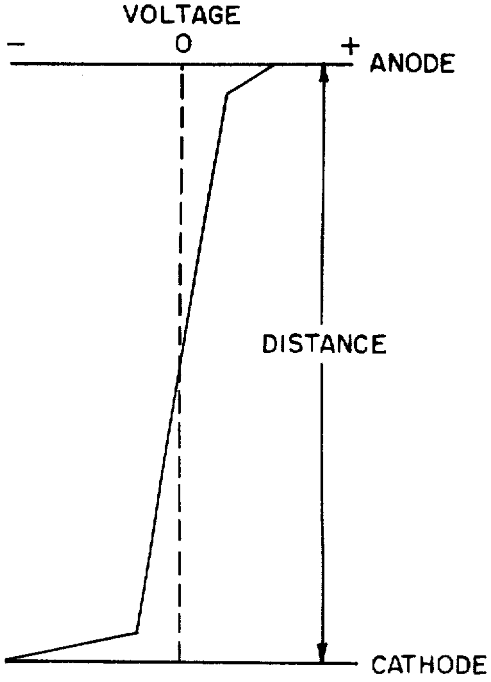
FIG. 3 is a graph illustrating the voltage drops due to solution resistance and polarization of the electrodes.

FIG. 3 illustrates the voltage distribution that exists between the anode and cathode in a bath during plating. The voltage drop across the electrolyte, excluding the zones adjacent to the electrodes, is due to the resistance of the solution; this resistance remains relatively constant and is independent of current density. The voltage drops associated with the electrodes, however, are rather complicated functions of current density, temperature, stirring and active roughening agent. These voltage drops are generally referred to as overvoltages. It is the quantitative measure of cathodic overvoltage as a function of cathodic current density and the active roughening agent that provides the basis of the present invention.

The first step in the method is to define a calibration plot for the particular cell by running a series of tests using a pure form of the commercial electrolyte, that is, one without additives. The degree of stirring should be fairly constant from run to run although no great effort in maintaining exact parameters was found necessary. For practical purposes, the test temperature of the cell should be that of the commercial process. The magnitude of the overvoltage, that is, the voltage difference between the reference electrode 15 and test cathode 9 is set on the potentiostat and a run started. After a suitable period of time has elapsed for attainment of steady state condition, such as one minute, the cell current is read and the reading is then converted to cathodic current density. Thus, for example, from FIG. 4, and overvoltage of 30 mv. would result in a current density of 10–11 ma/cm$^2$ for the particular cell and the pure form of the commercial electrolyte being used. For the next run, the overvoltage might be set at 60 mv, then at 90 mv, and so on until a suitable range is covered. A new test cathode is recommended for each run.

Figure 4:
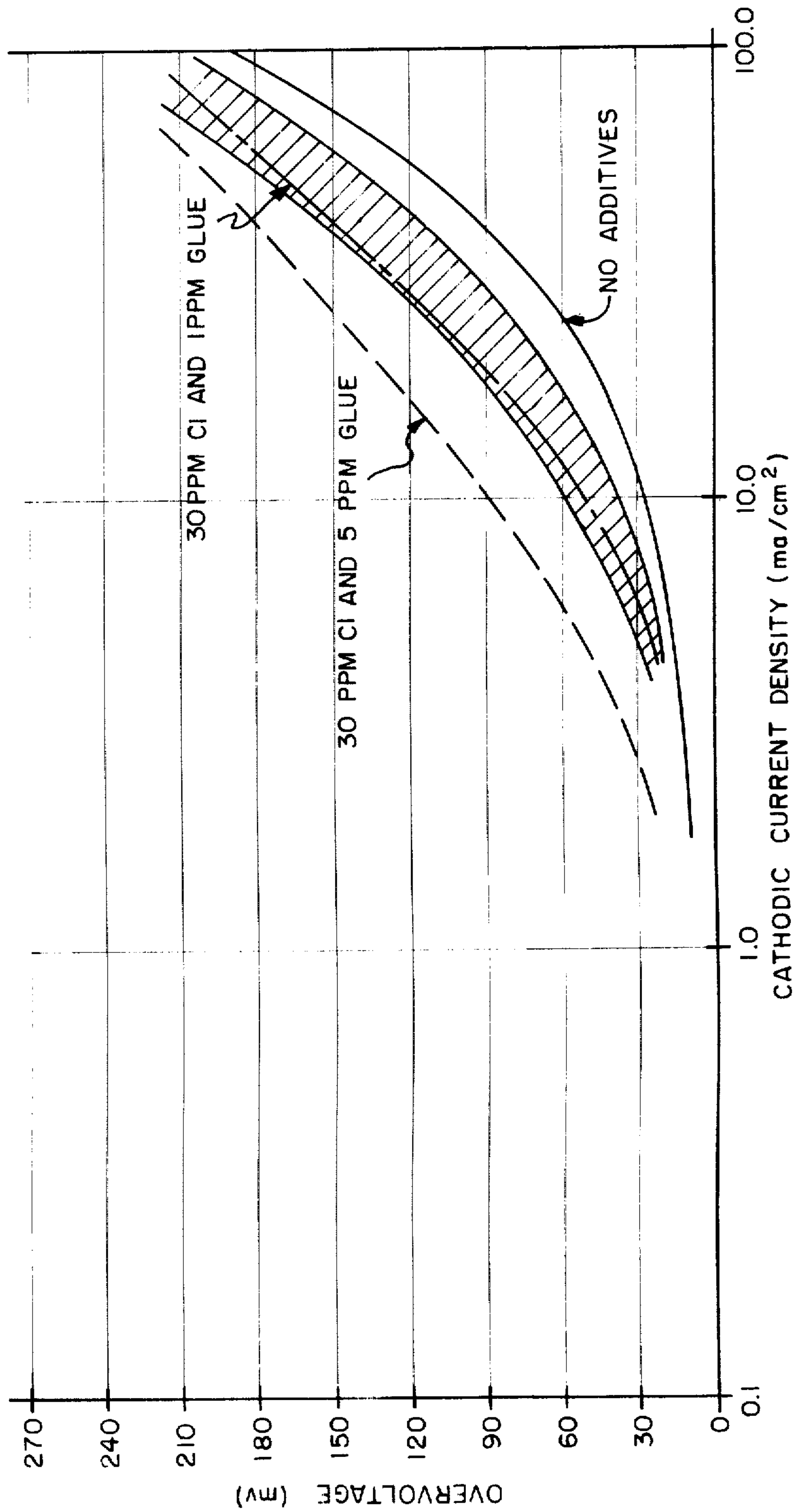
FIG. 4 is a graph plotting cathodic polarization or overvoltage, current density and active roughening agent content.

The solution is then altered by introduction of those additives which are intended to be used in the commercial bath and the series repeated until an adequate range of additives has been examined. FIG. 4 shows three such curves, one for the pure electrolyte which was 50 g/l Cu as $CuSO_4$ and 100 g/l $H_2SO_4$, a second modified with 30 ppm chloride and 1 ppm glue, and the third with 30 ppm chloride and 5 ppm glue. Note that the three curves trace distinctly different paths and that for any given overvoltage, considerably different current densities are observed. For example, at 90 mv the current densities for the three solutions described above are 40, 19 and 10 ma/cm$^2$ respectively.

During the course of pilot plant studies of plating, large numbers of additive levels were used to determine the effect on structures and surface microroughness. Samples of these electrolytes were run with the cell described above and the results revealed that a desirable product was attained only when the overvoltage-current density curve fell in a certain zone. For example, the quality of a printed foil having the desired columnar structure and particular surface roughness can be continuously maintained if the electrolyte's monitored-range was held within the cross hatched area shown on FIG. 4.

For control purposes it is not necessary to run an entire curve but instead select one overvoltage value where a substantial sensitivity exists. Thus, if the potentiostat is set at 90 mv, from FIG. 4, a good foil would be produced if the current density ranged from about 18 to about 29 ma/cm$^2$. Current densities outside this range indicate that the glue addition rate should be either increased or decreased accordingly.

In an alternative embodiment, where the current flow is held constant for a set of runs, galvanostatic means are used. For constant current settings, the overvoltages are measured to provide the required data.

It should be understood that although the example is specific for glue and the acid-copper electrolyte, the principles also apply to all other systems where the additives produce substantial changes in the overvoltage characteristics of either anode or cathode.

I claim:

1. A method of determining the amount of active roughening agent in a plating bath comprising a. submerging a test cathode in a quantity of the bath to be tested;

b. shielding the test cathode from exposure to the bath except for a defined area;

c. placing a reference electrode adjacent to the cathode;

d. maintaining either the voltage difference between the cathode and reference electrode substantially constant or the current density in the defined area of the cathode substantially constant;

e. measuring said current density or said voltage difference whichever is not held constant;

f. thereafter repeating steps (d) and (e) with selected voltage differentials or selected current densities with baths having varying known active roughening agent content; and g. finally determining the amount of such agent in an unknown bath by i. controlling the voltage applied or controlling the current density;

ii. measuring the current density or voltage differential whichever is not controlled; and iii. comparing the data with said prior measurements of (e) above.

2. The method of claim 1 in which the voltage between reference electrode and cathode is held substantially constant using a potentiostat.

3. The method of claim 1 in which the current density is held substantially constant using a galvanostat.

* * * * *